May 16, 1950     M. T. MILLER ET AL     2,508,074
THERMOSTATIC MIXING VALVE
Filed June 20, 1947     3 Sheets-Sheet 1
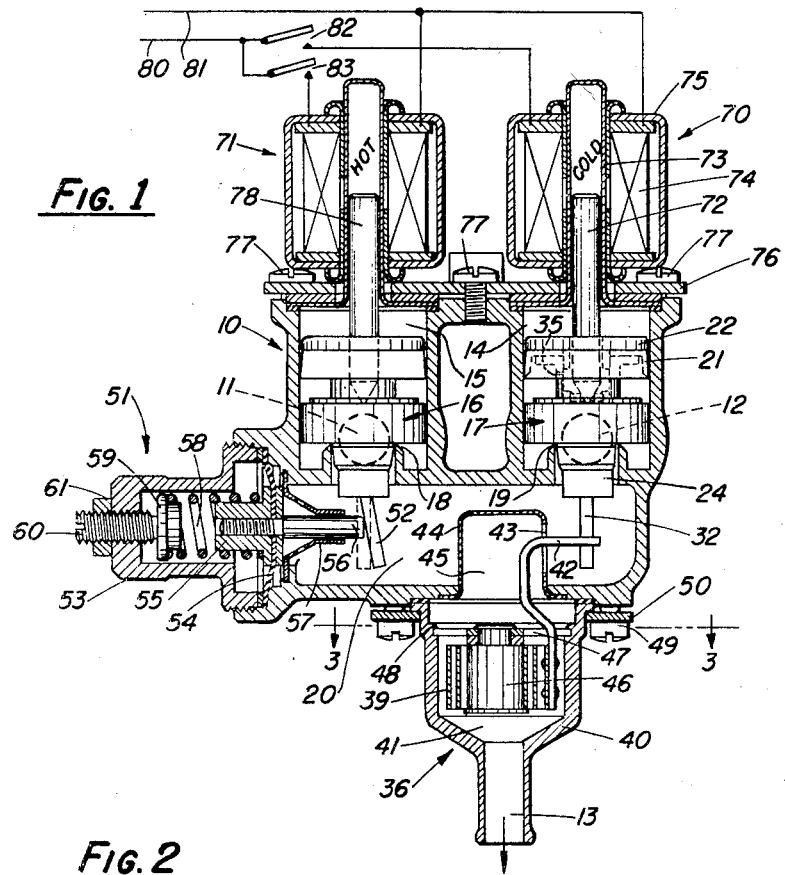
Fig. 1
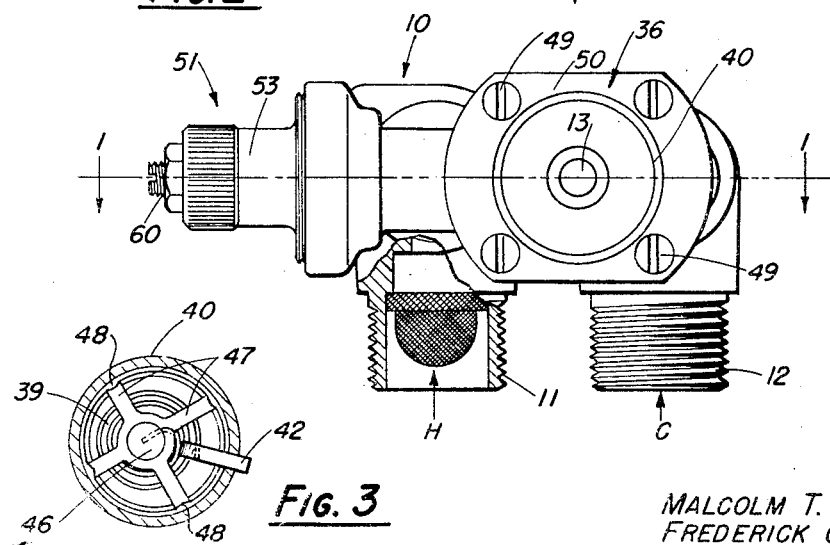
Fig. 2
Fig. 3
INVENTORS.
MALCOLM T. MILLER
FREDERICK C. BINNALL
CARL H. KRAUSE
BY *Parker & Carter*
ATTORNEYS May 16, 1950
M. T. MILLER ET AL
2,508,074
THERMOSTATIC MIXING VALVE
Filed June 20, 1947
3 Sheets-Sheet 2
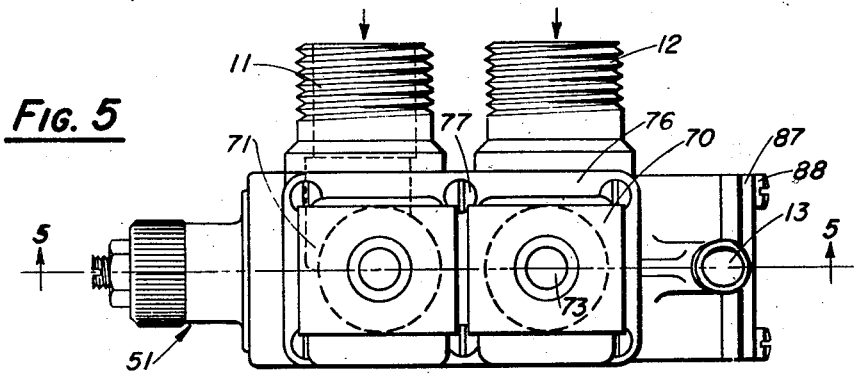
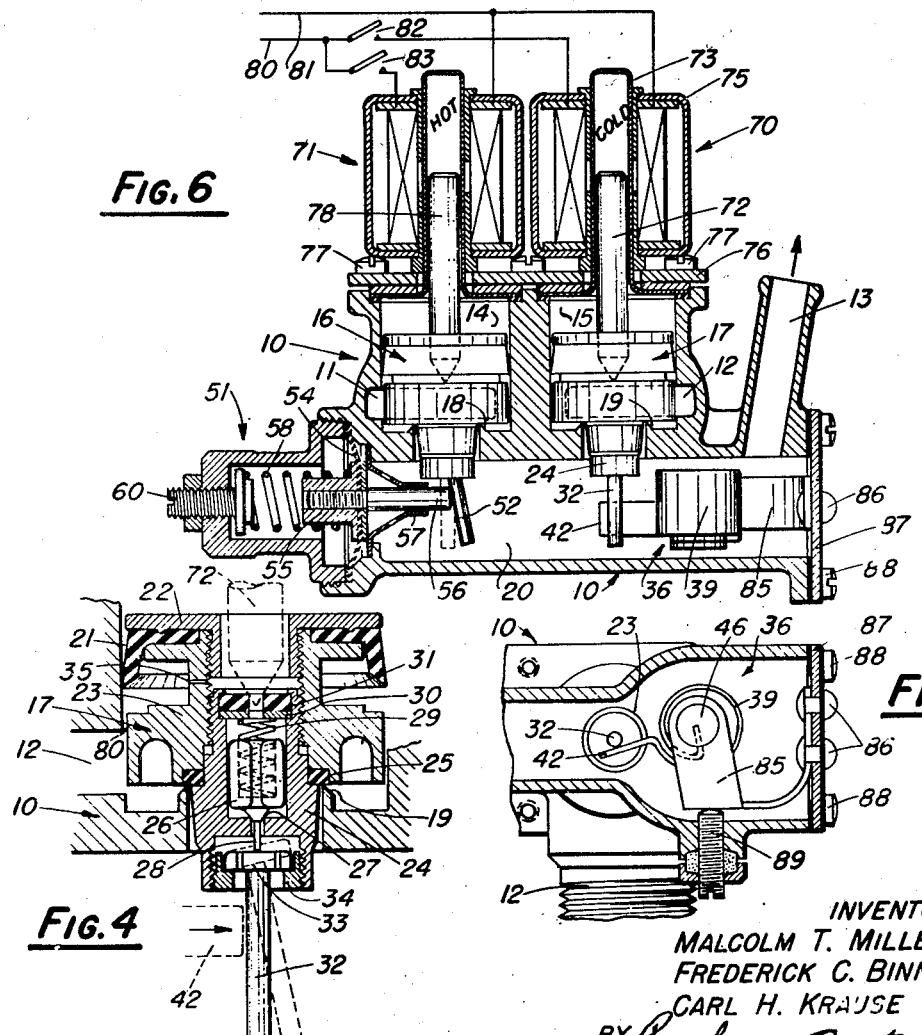
INVENTORS.
MALCOLM T. MILLER
FREDERICK C. BINNALL
CARL H. KRAUSE
BY *Parker & Carter*
ATTORNEYS May 16, 1950 M. T. MILLER ET AL 2,508,074
THERMOSTATIC MIXING VALVE
Filed June 20, 1947 3 Sheets-Sheet 3

INVENTORS.
MALCOLM T. MILLER
FREDERICK C. BINNALL
CARL H. KRAUSE
BY
ATTORNEYS

Patented May 16, 1950

2,508,074

UNITED STATES PATENT OFFICE 2,508,074

THERMOSTATIC MIXING VALVE

Malcolm T. Miller, Oak Park, Frederick C. Binnall, River Forest, and Carl H. Krause, Chicago, Ill., assignors to Sloan Valve Company, Chicago, Ill., a corporation of Illinois Application June 20, 1947, Serial No. 755,862

7 Claims. (Cl. 236—12)

This invention relates in general to fluid mixing valves, but more particularly to mixing valves for mixing two or more fluids and for maintaining a substantially constant predetermined temperature of the fluids at the outlet of the valve.

An object of the invention is to provide a new and improved fluid mixing valve in which the temperature of the mixed fluids, as well as the rate of fluid flow, is maintained at a constant predetermined value at the outlet, regardless of variations in the temperatures or pressures of each of the incoming supply fluids being mixed.

Another object of the invention is to provide a mixing valve having improved valve operating means for each of the supply fluids and in which auxiliary pilot valve means are provided for each supply inlet valve, one of which is controlled by the fluid pressure existing within the device and the other by the temperature therein.

Other objects are to provide a mixing device of the character described which is compact, simple, and rugged in structure, has a minimum of operating parts, is economical to manufacture and maintain, and is efficient and reliable in operation for its intended purpose.

The foregoing and other objects will be more fully pointed out hereinafter from a consideration of the detailed description of the invention. The invention is capable of expression in a number of different ways, three modifications of which are disclosed in the present case. It is, however, to be understood that the drawings are for the purpose of illustration only and are not to be construed as defining the limits of the invention, reference being had to the appended claims for defining the scope thereof.

In the drawings where like parts are indicated by the same reference characters throughout the several views:

Fig. 1 is a cross-sectional elevation of an embodiment of the present invention;

Fig. 2 is a bottom view of Fig. 1 with certain parts broken away;

Fig. 3 is a cross-section along the line 3—3 of Fig. 1 of the thermostat support;

Fig. 4 is a large scale cross-sectional view of the piston valve used in the embodiments of the invention illustrated in Figs. 1 and 6;

Fig. 5 is a top view of a second embodiment of the invention;

Fig. 6 is a cross-section taken along the line 5—5 of Fig. 4;

Fig. 7 is a bottom view of a portion of Fig. 6;

Figure 8:
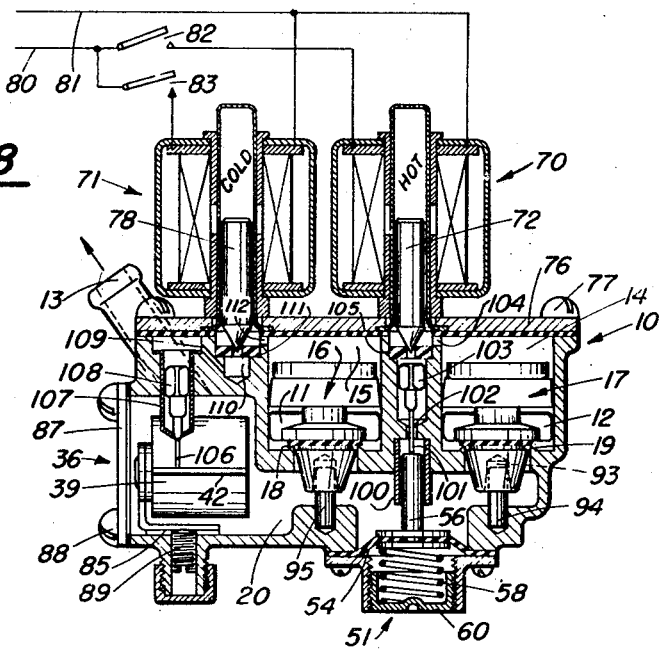
Fig. 8 is a cross-sectional elevation of a third embodiment of the invention.

The invention is illustrated preferably as a device for mixing hot and cold water to obtain a mixture of predetermined temperature in connection with the operation of domestic automatic washing machines and the like, but it is to be understood that the invention is equally applicable to the mixing of other liquids or where it is necessary or desirable to maintain the temperature of the mixed fluids within predetermined specified limits.

Referring to the embodiment illustrated in Fig. 1, the device comprises essentially a brass body of the shape shown and is indicated generally by the reference character 10, having a suitable screened supply inlet 11 on the side thereof for connection to a source of hot water, and a second supply inlet 12 to which a source of cold water supply is connected. At the bottom of the device an outlet nozzle 13 for the tempered mixed water is located. A pair of piston valve chambers 14 and 15 are located side by side in the body 10 for the accommodation of the piston valves 16 and 17, which are adapted to move vertically within the respective chambers 14 and 15. The hot and cold inlet fluid supply 11 and 12 feeds directly into the piston chambers. The pistons are adapted to move relative to piston valve seats 18 and 19 located respectively in the bottom of the piston chambers 14 and 15 and around fluid ports leading into a fluid pressure chamber 20. The pistons control the admission of the hot and cold fluids from the piston chambers directly into the fluid pressure chamber 20 which is arranged horizontally across the lower end of the piston chambers in the body 10 as shown.

Referring now particularly to Fig. 4, this shows an enlarged cross-section of the specific type of piston valve employed in the mixing valve of the invention, and it will be understood that both of the piston valves 16 and 17 are of identical structure and operate within their respective piston chambers in exactly the same manner. The pistons each include a flexible rubber packing member 21 slidably engaging the side walls of the piston chamber 14 and dividing it into upper and lower sections. This packing member 21 is rigidly clamped in position on the piston 17 by means of a top plate 22 threaded into the body portion 23 of the piston. At its lower end, the piston 17 is provided with a throttle portion 24 threaded into piston body 23 and which is adapted to enter the fluid port leading into the pressure chamber 20.

A suitable valve packing ring 25 is clamped between the piston body 23 and throttle 24, and is adapted when the piston valve is in its lowermost position, to shut off the fluid flow into the pressure chamber 20 by engaging the seat 19 formed in the bottom of piston chamber 14. Movement of the piston upward from the seat 19 permits the fluid from the associated inlet 12 to pass directly into the pressure chamber 20 according to the degree of movement of the piston.

The piston body 17 is also provided with a central bore as shown, within which a pilot valve 26 is adapted to be movably controlled. This pilot valve 26 has a square-shaped body portion and is provided with a tapered valve portion at its lower end adapted to seat on a valve seat 27, which is arranged around an opening in the throttle 24 to close off the opening whenever the pilot valve 26 is in its lowermost position. The pilot valve 26 is additionally provided with an operating stem 28 passing through the central opening of the throttle 24, and at its upper end is normally urged into seated position by a small coil spring 29, extending into a bored out portion centrally located in the pilot valve as shown. The spring 29, in turn, butts against a small brass washer 30 on top of which there is located a shut-off valve seat 31, having a central valve opening therein. The washer 30 and valve seat 31 are both held in position on the top end of the piston throttle 24 by a crimped-over portion thereon. At the lower end of the piston throttle 24 there is supported an auxiliary pilot valve control stem 32 having a head portion 33 located within a recess formed in the lower portion of throttle 24. A locking ring 34 threaded into the throttle 24 holds the head 33 of pin 32 loosely and in such a manner as to permit free tilting movement of the head 33. It is preferable that the head 33 be provided with perpendicular slots as shown to facilitate the passage of water around the head.

It is to be particularly noted that all of the aforesaid described elements of the piston valve are so constructed and arranged as to be axially located with respect to one another and the valve seat 19. For a purpose to be hereinafter described, a small by-pass opening 35 is located in the side wall of the piston body 23 extending from the outside of the piston into the central bore therein. The arrangement for controlling the pilot valve 26 is such that the stem 32 has a tilting action imparted to it so that the headed portion 33 will assume a slight tilting movement from one end thereof based against the retaining ring 34. This action will raise the pilot valve stem 28 upwardly and move the pilot valve 26 away from its seat 27 against the tension exerted by the spring 29, dependent upon the degree of thrust imparted to stem 32. When the force exerted against stem 32 is released, spring 29 moves the pilot valve downward again against its seat 27.

The means for actuating the pilot valve stem 32 of piston valve 17 comprises a thermostatic control device indicated generally at 36. This device includes preferably a coiled bimetallic element 39, as shown in Fig. 1, arranged within an outlet casing 40 attached to body 10, and which casing provides a chamber 41 through which all of the mixed fluid passes before emerging from the outlet 13. The free end of the bimetal element 39 has secured to it as by riveting an operating arm 42, the end of which is adapted to engage and tilt the pilot valve control stem 32 whenever an expanding action of the thermostatic element 39 occurs. The operating arm 42 extends upwardly from outlet chamber 41 and into the pressure chamber 20 through an opening 43 formed in cup-shaped member 44, also projecting within the pressure chamber 20. The cup-shaped member 44 defines a fluid mixing chamber 45 into which the hot and cold fluids from the pressure chamber 20 are thoroughly intermingled and mixed after passing through the opening 43 from both inlets and before the temperature of the mixture can manifest itself on the thermostat 39.

The bimetal element 39 is itself supported at its inner end and centrally (see Fig. 3) by an arbor 46, which at its upper end is securely riveted to a spider-shaped bracket 47, having its ends crimped, as shown at 48, to the inside of the outlet casing 40. It is desirable that the thermostat element 39 be pre-adjusted to provide a certain temperature of the mixed fluid at the outlet 13, and for this purpose the outlet casing 40 is adjustably clamped to the casing 10 by a clamping plate 50 and a number of fastening screws 49, as shown in Fig. 2, so that by loosening the screws 49, the casing 40 can be easily rotated in any axial direction, after which the screws 49 are again tightened against the clamp plate 50. This action will cause the bi-metal element 39 to be rotated slightly in the direction desired, thereby pre-adjusting the response of the thermostat in its control of operating arm 42 and the pilot valve stem 32.

The other piston valve 16 (see Fig. 1) is adapted to be controlled by a pressure responsive device, indicated generally at 51, and preferably constructed in the form of a diaphragm control element. This pressure device 51 is arranged to control and effect the operation of the auxiliary pilot valve stem 52 of piston 16 in the same manner that the operating arm 42 tilts the pilot valve stem 32 of piston valve 17. The pressure control device 51 includes a cup-shaped member or casing 53 threadedly engaging the valve body 10 at one end of the pressure chamber 20, as shown. The open end of casing 53 clamps a flexible diaphragm 54 and associated slip ring against a shoulder arranged in body 10 at the end of pressure chamber 20. A supporting stud 55 is fastened on the rear side of the diaphragm 54 and an operating plunger 56 on the front side, threads into the stud 55 so as to clamp the two elements together on the diaphragm 54. A guiding sleeve 57 loosely surrounds the plunger 56 and is clamped to a shoulder arranged in the body 10, closing off the pressure chamber 20. Openings arranged around the guiding sleeve 57 permit the pressure within chamber 20 to be exerted upon the front side of diaphragm 54. The sleeve 57 also acts as a stop to prevent too great a forward flexing of the diaphragm. In order to normally urge the diaphragm in a forward flexed position, as shown, and to move it forward as the pressure in chamber 20 is reduced, a coil spring 58 is provided which encircles stud 55 at one end. Adjusting means are provided for adjusting the tension of spring 58 and this includes a retaining plug 59 adapted to engage the free end of spring 58, which plug in turn is adapted to be engaged by a threaded adjusting screw 60 passing through the end of the cup member 53.

Turning the screw 60 in or out applies more or less tension to the diaphragm 54 and adjusts its response to the pressure exerted within chamber 20. For locking the adjustment in a particular position, the lock nut 61 is provided on adjusting screw 60.

It is evident from the foregoing construction and arrangement of elements, that the movement of the piston valve 16 to admit hot fluid, for example, into the pressure chamber 20, is controlled entirely by the pressure responsive element 54, as a result of the fluid pressures in chamber 20, while the piston 17 is controlled by the thermostat 39 to admit cold fluid in accordance with the temperature of the mixed liquid in mixing chamber 45, entirely independent of the pressure device 51.

In order to further control the operation of the piston valves 16 and 17 for the purpose to be hereinafter described, a pair of solenoids 70 and 71 are provided and located on top of the valve body 10 directly in line with their associated piston valves. These solenoids when remotely operated either automatically or at will, provide a further control of the operation of the respective piston valves.

Since both solenoids 70 and 71 are constructed identically, only one of them will be described in detail. Each solenoid includes a reciprocating plunger 72, the lower pointed end of which normally rests within the opening of the valve seat 31, located in piston 17, as shown by the dotted lines in Fig. 4. The gravity weight of the plunger 72 is sufficient to hold the plunger in its seated position. The plunger 72 is adapted to slide perpendicular within a sleeve member 73, which sleeve is provided with a lower flared portion clamped directly over the end opening in the piston chamber 14 to close off the opening. The solenoid coil winding 74 surrounds the sleeve 73 and a suitable magnetic circuit for the solenoid is provided including the frame 75. In order to support the solenoid, a clamping plate 76, through which the sleeve 73 projects, is fastened directly to the top side of the body of the valve 10 by means of a series of screws 77, suitable intermediate gaskets being provided as shown. The solenoid 71 is similarly constructed and includes its associated plunger 78. For energizing the solenoids 70 and 71, suitable electrical connections are shown diagrammatically and include a source of electrical current passing over wires 80 and 81 through switches 82 and 83 for remotely controlling the operation of the solenoids.

With the arrangement and construction of the elements of the mixing valve just described, the liquid supply from the cold inlet 12, for example, passes into the piston chamber 14, and now since the solenoid plunger 72 normally rests on the valve seat 31 and the pilot stem 32 is not tilted, no upward movement of the piston 17 from its seat 19 can take place. This is so because the fluid pressure within the chamber 14 is manifested around the lower piston body 23 (see Fig. 4) below the packing member 21 and through the small by-pass opening 35 in the wall of the body 23 into the interior bore of the piston 17 and to the upper portion of chamber 14 on top of the plate 22. The pressure of the fluid is equal on both sides of the packing member 21. However, due to the greater surface area directly on top of the piston, the water pressure will tend to force the piston 17 downward on seat 19 and hold it in this position closing off the fluid flow. Now, when the solenoid winding 74 is energized, the plunger 72 is moved upwardly and its lower pointed end disengaged from seated position with the valve seat 31. This permits the pressure on the upper side of the piston 17 to be manifested also within the central bore of the piston containing the pilot valve 26, which however at this time is assumed to be seated tightly against the valve seat 27 due to the pilot stem not being tilted. The piston 17 still remains seated on its seat 19.

When activated, the pilot operating stem 32 is tilted as by action of the thermostat arm 42, and the head 33 pivots upward pushing the pilot valve stem 28 upward and moving it away from engagement with the pilot valve seat 27. This action releases the fluid pressure from the top chamber of the piston 17, and since the area of valve seat 27 is greater than the by-pass opening 35, the fluid pressure is reduced and the liquid passes down through the piston bore and central opening in the valve seat 31, around the outside of pilot valve 26, through the opening around which valve seat 27 is located, around the sides of the head 33, and into the pressure chamber 20. The piston 17 is no longer forced against its seat 19 and is moved upward by the inlet supply pressure exerted on the underside of the packing 21, causing the inlet fluid supply 12 to pass directly into the pressure chamber 20 in accordance with the amount of movement of the piston 17 away from its seat 19. As the pilot control stem 32 assumes a more vertical position, the pilot valve 26 moves down and again approaches its seat 27, causing the piston 17 to again move downward, as the pressure builds up on top of the piston valve through the by-pass opening 35.

The inlet supply opening 12 is arranged below the top surface of piston body 23. This forces the inlet fluid supply to pass as a thin film within the narrow confines between the piston body 23 and the walls of the piston chamber 14 as indicated at 80 in Fig. 4 and prevents chattering and vibration of the piston valve as it operates, as well as insuring accurate guiding.

In an exemplification of the invention, for example, as shown in Fig. 1, the thermostat 36 is adjusted to a position whereby it tends to maintain a fixed fluid temperature at the outlet 13 of about 100 degrees Fahrenheit, while the pressure device 51 is adjusted to provide a constant pressure of about 9 pounds in pressure chamber 20. The outlet rate of flow of the fluid mixture will be at the rate of 3½ G. P. M. while the inlet supply pressure of the hot and cold fluids will ordinarily vary greatly between 10 and 150 pounds.

The manner of operation of the mixing device just described may be generally summarized by first assuming that both hot and cold fluids are being supplied to the fluid mixing chamber 45 in the proper proportions so as to maintain the fluid mixture at the standard predetermined temperature and fixed flow rate, and that this fluid mixture is being discharged from the outlet nozzle 13. Assume also that both solenoids 70 and 71 have been energized by the closure of switches 82 and 83 so that plungers 72 and 78 are elevated from their valve seated positions. With these conditions existing any slight change in the temperature of the fluid mixture due to a change in temperature of either the hot or cold fluids being supplied, immediately affects the thermostat which reacts to cause the piston 17 to move relative to its seat 19 and thereby to permit more or less cold fluid to flow from the supply inlet 12 into pressure chamber 20. This also causes a change in the pressure in chamber 20 which is then compensated for by piston 16.

Let it be assumed now that the change in temperature of the mixture is such as to result in a slight temperature increase of the mixture, the effect of the thermostat is to cause the cold piston valve 17 to move open slightly so as to increase the amount of cold fluid entering the pressure chamber 20. This action is brought about as described by the thermostat 39 tilting stem 32 to lift pilot valve 26 slightly away from its seat 27, thereby releasing the built up pressure above cold piston valve 17 and causing the piston to move slightly away from its seat 19 and accordingly increasing the amount of cold fluid entering pressure chamber 20.

The opening of piston valve 17, while increasing the amount of fluid accordingly also simultaneously slightly increases the pressure of the fluid mixture in pressure chamber 20 and the effect of this pressure increase is to cause the pressure diaphragm 54 to be moved outward to cause hot piston valve 16 to slightly close on its seat 18 and thereby decrease the amount of hot fluid entering the pressure chamber 20 from the hot inlet 11. This result occurs as described by the pressure rise in chamber 20, forcing diaphragm 54 outward slightly, and since plunger 56 is carried by the diaphragm 54, it moves away slightly from its contact with pilot control stem 52. The plunger 56 is guided by the member 57 which also assists in preventing buckling of the diaphragm 54. Since stem 52 is now caused to assume a more vertical position, the pilot valve 26 urged by spring 29, moves closer toward its seat 27, thereby permitting pressure to build up in the chamber above hot piston 16 through the by-pass opening 35. As a result, piston valve 16 moves downward towards its seat 18 and thereby causes a decrease of hot fluid to flow to pressure chamber 20 to bring the pressure of the mixture in mixing chamber 45 back to the predetermined standard. As a consequence, temperature and pressure conditions have again been restored to the predetermined standard.

When the opposite condition occurs from that just described, wherein the change in temperature of the fluid mixture is a slight temperature decrease, the effect of the thermostat is to cause the cold piston valve 17 to close slightly on its seat 19 so as to decrease the amount of cold fluid entering the chamber 20. This also decreases the pressure within chamber 20, resulting in the pressure device 51 effecting the movement of hot piston valve 16 to assume a more open position from its seat 18 and thereby increasing the amount of hot fluid entering chamber 20. The temperature of the mixture at outlet 13 is accordingly increased to the predetermined standard and the pressure in chamber 20 maintained at its set value.

Assume now, for example, that the supply pressure of the hot fluid line 11 increases, which would in turn tend to increase the amount of hot fluid supplied to the pressure chamber and tend to increase the pressure in the chamber 2. This increase in pressure is instantaneously transmitted to the pressure device 51 with the result that the hot fluid valve 16 is closed slightly, maintaining the predetermined pressure in chamber 20, and no change in hot flow rate occurs. If, on the other hand, the cold fluid supply pressure should increase and thereby increase the amount of cold fluid in proportion to the hot fluid, this increased pressure would tend to also affect the pressure diaphragm 54 to decrease the amount of hot fluid through hot piston valve 16. However, simultaneously therewith, the thermostat 39 reacts to the increase in cold fluid and immediately causes cold piston valve 17 to move toward its seat to decrease the amount of cold fluid to restore the original temperature, and the hot piston valve 16 will move as required to restore the original pressure in chamber 20. Any other variation which may occur in the temperatures, pressures and rates of flow of the fluids will be accompanied by a similar compensation and balanced operation of the piston valves which are thereby effective to maintain the temperature of the mixed fluid at the outlet substantially constant while the rate of fluid flow will be at a fixed value.

From the foregoing construction and operation described, it will also be clear that the device automatically adjusts itself to maintain a fixed predetermined fluid pressure within the pressure chamber 20 regardless of variations in the pressures or rates of flow of the hot and cold fluids. This assures that the rate of flow from the mixed fluid outlet 13 will remain constant under all inlet supply line conditions.

It will be obvious that the invention contemplates a thermostatic mixing valve having separate inlet supply chambers, a pressure chamber having a pressure responsive device therein, a mixing chamber for mixing the separate fluids, and a thermostat chamber having a temperature responsive device therein which responds to the temperature of the mixed fluids after they pass through the mixing chamber.

It will be apparent that the hot and cold supply inlets may be transposed so that the thermostat would directly control the piston valve in the hot fluid line and the pressure device control the cold piston valve.

Under certain conditions of automatic washing machine operation, it is desirable that only hot water be used and the present device is arranged to provide this. The closure of electric switch 83 energizes only solenoid 71 which thereupon withdraws its plunger 78 from the hot piston valve 16, resulting in the immediate opening of this valve since the pressure device 51 tilts the pilot valve control stem 52 to maintain a fixed pressure within pressure chamber 20. The thermostat 39 reacts to this flow of hot water, but since solenoid 70 has not been operated, the cold piston valve 17 remains closed. Accordingly, only hot water flows from outlet 13 at a fixed rate of flow.

Referring to the embodiment of the invention illustrated in Figs. 5, 6, and 7, the various elements herein are constructed and operate in a similar manner as that described in connection with the embodiment of Fig. 1, with the exception that in this instance the chamber 20 constitutes a combined pressure and mixing chamber rather than the two separate chambers as in Fig. 1. The temperature responsive device 39 is accordingly arranged in a somewhat different manner and is located at one end of the combination pressure and mixing chamber 20, while the pressure responsive device 51 is arranged directly at the opposite end of the chamber. The outlet 13 for the mixed fluid is positioned in this instance at the top of the chamber adjacent the thermostat.

The thermostat bimetal element 39 is supported at its inner end by the arbor 46, which is attached rigidly to an angular adjusting plate 85, the other end being securely supported as by rivets 86, to the end plate 87 attached by screws 88 to the open end of chamber 20. An adjusting screw 89 threaded into the side of the body 10 is adapted to shift the position of the bimetal 39 to adjust its temperature response, as is clearly noted in Fig. 7. With the operation of the various elements in mind, and as described in connection with Fig. 1, it will be obvious that the present embodiment will operate in a similar manner. The chamber 20, being a combined pressure and mixing chamber, the fluids passing therethrough will affect the pressure device 51 whenever the pressures vary, while temperature variations within the chamber will manifest themselves upon the thermostat 39 after the fluids have been thoroughly intermingled and mixed in the chamber, since the thermostatic element is arranged close to the outlet 13.

Figure 9:
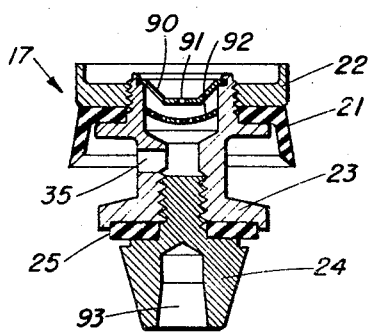
Fig. 9 is a cross-section of the piston valve used in Fig. 8.

Referring now to the third embodiment of the invention, as disclosed in Figs. 8 and 9, the principal differences between this structure and that of Fig. 1 reside in the arrangement of the pilot control valves. Whereas in Fig. 1, these pilot control valves 26 are arranged centrally and axially within the piston valves themselves, in the modification shown in Fig. 8 they are placed within the body outside of the respective pistons. All other elements are arranged and the operations of the device take place in a similar manner as in Fig. 1.

Referring particularly to Fig. 9, this shows an enlarged view of one of the pistons 17 employed in this modification. They include a packing member 21, top plate 22, a body 23 and a throttle portion 24, with the rubber valve seat 25 clamped between body 23 and throttle 24. A relatively large by-pass opening 35 extends through the body 23, in contrast to the by-pass opening 35, shown in the piston of Fig. 4. However, a by-pass disc 90 is crimped to the body 23 and this in turn has a small by-pass opening 91 centrally located therein. In order to protect this small opening 91 and screen it from foreign particles, a screen disc 92 is placed in the body ahead of the disc 90. At its bottom end the throttle 24 has a bore 93 drilled therein, which is adapted to slide on a pin 94 arranged at the bottom of the body 10 for guiding the movements of the piston. A similar guiding pin 95 is arranged for the piston valve 16.

The piston valve 17 is controlled by the action of the pressure responsive device 51 having its plunger 56 vertically slidable within the sleeve 100. The end of the plunger 56 is adapted to contact the pilot valve stem 101 through an opening forming valve seat 102, upon which the pilot valve 103 is adapted to seat. Movement of the pressure responsive device 51 accordingly moves the pilot valve 103 relative to its seat 102. At the upper end of the bore within which pilot valve 103 operates, there is a by-pass opening 104 extending to the upper side of the piston chamber 14, within which piston valve 17 is adapted to operate. A rubber valve seat 105 is arranged directly above the pilot valve 103 to serve as a valve seat for the solenoid plunger 72.

At the other end of the combination pressure and mixing chamber 20, the thermostat device 36 is arranged. Its operating arm 42 is adapted to contact the pilot valve stem 106, which is slidably guided in its sleeve 107 within which the pilot valve 108 is adapted to operate. A by-pass opening 109 extends from the upper side of the bore within which the pilot valve 108 operates, to a second bore 110 containing a rubber valve seat 111. The solenoid plunger 78 is adapted to seat upon the rubber seat 111. A second by-pass opening 112 extends from the upper chamber 15 of piston valve 16 to the upper side of the valve seat 111.

With the foregoing described construction of this modification, the operation will be somewhat similar to that described in connection with Fig. 1, in that pressure responsive variations of the diaphragm 54 result in the upward movement of the pilot valve 103 with respect to its seat 102. Provided now that the solenoids 70 and 71 are operated, and their plungers 72 and 78 are raised upwardly from seated position on seats 105 and 111, a passage for fluid flow exists through the sleeve 100, valve seat 102, the sides of pilot valve 103, and by-pass opening 104 from the chamber 14, thereby relieving the pressure therein and permitting piston valve 17 to move away from its seat 19, guided by the pin 94. The extent of movement of piston 17 is determined by the relative position of the pilot valve 103 from its seat 102.

Temperature variations within the chamber 20 are controlled by the thermostat 39, which moves the pilot valve 108 and relieves pressure from the upper chamber 15 of piston 16 over a fluid flow path extending through the seat of sleeve 107, the sides of pilot valve 108, by-pass opening 109, the opening within valve seat 111, by-pass opening 112 and from the upper chamber 15. Movements of the bimetal element 39 and the respective movements of pilot valve 108 result in the shifting of piston valve 16 with respect to its valve seat 18. As has been previously described, other variations in the operation as regards pressure, temperature and rate of flow changes will be the same. In all instances, the fluid temperature of the mixture emitted from the outlet 13 will be substantially at a predetermined constant temperature and rate of flow.

The term "piston valve," as used throughout the specification and claims, is intended to mean a "piston operated valve" as generally applied in the art to a plug type of valve having a piston member thereon which is connected to the valve for operating the same. The expression is not intended to refer to the type of valve having a piston skirt adapted to align with side ports in the valve body when the piston is moved.

It will be understood that the various embodiments of the invention illustrated in the drawing have been described with some detail, but it is expressly to be understood that the invention is capable of receiving a wide variety of mechanical equivalents, many of which are readily apparent to those skilled in the art and various changes may be made in the details of construction, arrangement, proportion and shape of the parts without departing from the spirit of the invention. Reference is therefore to be had to the appended claims for a clearer definition of the invention.

What is claimed is:

1. In a fluid mixing device having a fluid chamber therein and two separate piston chambers, each piston chamber having a fluid inlet therein and a valve seat around an opening leading into said fluid chamber, a piston valve in each piston chamber movable relative to the associated valve seat to control the fluid flow into said fluid chamber, each piston valve dividing its piston chamber into an upper and a lower chamber, each piston having a by-pass therein extending between the upper and lower chamber whereby the effective fluid pressure of the associated fluid inlet is exerted in the upper chamber of the piston valve to tend to hold the piston valve upon its valve seat, each of said piston valves having a pilot chamber arranged axially therein, a remote control valve and seat therefor arranged on the upper end of said pilot chamber for controlling the passage of fluid from the upper piston chamber into said pilot chamber, a pilot valve and seat therefor arranged on the lower end of said pilot chamber for controlling the passage of fluid from said pilot chamber to said fluid chamber, said pilot valve operable to relieve the fluid pressure in the upper piston chamber to cause the piston to move from its seat provided said remote control valve is operated, thermostatic means for operating one of said pilot valves, and pressure responsive means for operating the other of said pilot valves.

2. In a fluid mixing device, a fluid chamber having a fluid outlet, two piston chambers each having a fluid inlet and a valve seated outlet leading into said fluid chamber, a piston valve slidably arranged in each of said piston chambers, each piston valve having a by-pass opening extending between opposite sides of said piston valve, each of said piston valves having a pilot chamber arranged axially therein, a remote control valve and seat therefor arranged on the upper end of said pilot chamber for controlling the passage of fluid from the upper piston chamber into said pilot chamber, a pilot valve and seat therefor arranged on the lower end of said pilot chamber for controlling the passage of fluid from said pilot chamber to said fluid chamber, said pilot valve operable to relieve the fluid pressure in the upper piston chamber to cause the piston to move from its seat provided said remote control valve is operated, an operating stem for each pilot valve extending into said fluid chamber, one of said pilot valve stems being operatively associated with said temperature responsive means and the other of said pilot valve stems with said pressure responsive means, and hydraulic means for operating said piston valves whenever said pilot valves are operated.

3. In a fluid mixing device, a fluid chamber having a fluid outlet, two separate piston chambers each having a separate fluid inlet and a valve seated outlet leading into said fluid chamber, a separate piston valve slidably arranged in each piston chamber, each piston valve having a by-pass opening extending between opposite sides of said piston valve, a pilot valve and a remote controlled valve in each of said piston valves, an operating stem for each pilot valve extending into said fluid chamber, separate condition responsive means in said fluid chamber operatively associated with each of said pilot valve stems, and hydraulic means for operating said piston valves independently of one another whenever said pilot valves and said remote controlled valves are operated; said remote controlled valve, said pilot valve, said piston valve seat, and said pilot valve stem all being axially arranged with respect to one another in said device.

4. In a fluid mixing device having a fluid inlet chamber and a mixing chamber connected therewith, two spaced-apart piston chambers, a fluid inlet for each piston chamber, said piston chambers each being arranged perpendicular to and having an opening leading into said fluid inlet chamber, valve seats formed around said piston chamber openings, a piston valve in each of said piston chambers resting on said valve seats for controlling the fluid flow from the associated inlet into said inlet chamber, thermostatic means in said mixing chamber operatively connected to one of said piston valves for causing said piston valve to move relative to its valve seat in accordance with temperature variations in said mixing chamber, pressure responsive means in said fluid inlet chamber operatively connected to the other of said piston valves for causing said piston valve to move relative to its seat in accordance with pressure variations in said fluid inlet chamber, and an outlet from said mixing chamber for the mixed fluids.

5. In a fluid mixing device having a fluid chamber therein and two separate piston chambers, each piston chamber having a fluid inlet therein and a valve seat arranged around an opening leading into said fluid chamber, a piston valve in each piston chamber movable relative to its valve seat to control the fluid flow into said fluid chamber from one of said fluid inlets, each piston valve arranged to divide its piston chamber into an upper and a lower chamber, each piston having a by-pass therein extending between the piston chambers whereby the fluid pressure from one of said inlets is effective to move the piston valve towards its valve seat, the effective pressure area upon the piston valve in the upper chamber being greater than that against the piston valve in the lower chamber, each of said piston valves having a pilot chamber arranged axially therein, a remote control valve and seat therefor arranged on the upper end of said pilot chamber for controlling the passage of fluid from the upper piston chamber into said pilot chamber, a pilot valve and seat therefor arranged on the lower end of said pilot chamber for controlling the passage of fluid from said pilot chamber to said fluid chamber, said pilot valve operable to relieve the fluid pressure in the upper piston chamber to cause the piston to move from its seat provided said remote control valve is operated, thermostatic means operatively connected with one of said pilot valves, pressure responsive means operatively connected with the other of said pilot valves, and an outlet leading from said fluid chamber for the mixed fluids.

6. In a fluid mixing device comprising a body having a fluid chamber therein and two separate supply inlets leading into said fluid chamber, an outlet chamber leading from said fluid chamber, a piston valve in each of said supply inlets for controlling the admission of fluids from said supply inlets into said fluid chamber, a pressure responsive means in said fluid chamber for controlling the operation of one of said piston valves in accordance with pressure variations of the fluid in said fluid chamber, a thermostatic element in said outlet chamber for controlling the operation of the other of said piston valves in accordance with temperature changes of the fluid in said outlet chamber, and means for adjusting the temperature response of said thermostatic element, said adjusting means including a housing defining said outlet chamber adjustably secured to said mixing device body and rigidly supporting said thermostatic element therein and so arranged that axial rotation of said outlet chamber housing preadjusts the position of said thermostatic element within said outlet chamber.

7. In a fluid mixing device comprising a body having a fluid pressure chamber therein and separate fluid supply inlets leading into said pressure chamber, separate valve means for controlling the admission of the fluid from each of said supply inlets to said pressure chamber, an outlet chamber leading from said pressure chamber, pressure means for controlling one of said valve means and temperature control means for controlling the other of said valve means, and means for adjusting the response of said temperature control means including a housing defining said outlet chamber having a clamp plate thereon for removably fastening said housing to said mixing device body, means for rigidly supporting said temperature control means within said outlet chamber housing, said outlet chamber housing arranged to be axially rotated a limited amount when said clamp plate is loosened whereby said temperature control means are preadjusted to respond to a predetermined temperature of the mixed fluids in the outlet chamber.

MALCOLM T. MILLER.
FREDERICK C. BINNALL.
CARL H. KRAUSE.

REFERENCES CITED

The following references are of record in the file of this patent:

UNITED STATES PATENTS

| Number | Name | Date |
|---|---|---|
| 1,326,898 | Royle | Dec. 30, 1919 |
| 1,707,541 | Roth | Apr. 2, 1929 |
| 1,942,269 | Davies | Jan. 2, 1934 |
| 1,942,270 | Resek | Jan. 2, 1934 |
| 1,987,032 | Spence | Jan. 8, 1935 |
| 2,029,203 | Soderberg | Jan. 28, 1936 |
| 2,214,148 | Scott | Sept. 10, 1940 |
| 2,345,306 | Van Der Werff | Mar. 28, 1944 |
| 2,424,891 | Kirchoff | July 29, 1947 |

FOREIGN PATENTS

| Number | Country | Date |
|---|---|---|
| 681,545 | Germany | Sept. 25, 1939 |
| 834,361 | France | Aug. 16, 1938 |